United States Patent
Hackett et al.

(10) Patent No.: US 11,686,953 B2
(45) Date of Patent: *Jun. 27, 2023

(54) OXYGEN PERMEABLE CONTACT LENSES WITH THICK PAYLOADS

(71) Applicant: Tectus Corporation, Saratoga, CA (US)

(72) Inventors: Benjamin Lyle Hackett, Saratoga, CA (US); Eric Johnson, Mill Valley, CA (US); Michael West Wiemer, San Jose, CA (US); Donald Arthur Ice, Milpitas, CA (US)

(73) Assignee: Tectus Corporation, Saratoga, CA (US)

(*) Notice: Subject to any disclaimer, the term of this patent is extended or adjusted under 35 U.S.C. 154(b) by 52 days.

This patent is subject to a terminal disclaimer.

(21) Appl. No.: 17/543,500

(22) Filed: Dec. 6, 2021

(65) Prior Publication Data

US 2022/0091440 A1 Mar. 24, 2022

Related U.S. Application Data

(63) Continuation of application No. 16/184,242, filed on Nov. 8, 2018, now Pat. No. 11,231,597.

(51) Int. Cl.
*G02C 7/04* (2006.01)
*G02C 11/00* (2006.01)

(52) U.S. Cl.
CPC ............... *G02C 7/04* (2013.01); *G02C 11/10* (2013.01); *G02C 2202/16* (2013.01)

(58) Field of Classification Search
CPC .. G02C 7/04; G02C 7/025; G02C 7/041–049; G02C 11/10; G02C 2202/16; G02C 27/017; G02B 1/043

USPC ..................................... 351/159.02–159.04
See application file for complete search history.

(56) References Cited

U.S. PATENT DOCUMENTS

| | | |
|---|---|---|
| 3,973,838 A | 8/1976 | Page |
| 4,486,577 A | 12/1984 | Mueller |
| 4,594,401 A | 6/1986 | Takahashi |
| 4,954,587 A | 9/1990 | Mueller |
| 5,548,352 A | 8/1996 | Dewey |

(Continued)

OTHER PUBLICATIONS

Arianpour et al., "Wearable telescopic contact lens"; Applied Optics, vol. 54, No. 24; Aug. 20, 2015; p. 7195-7204.

(Continued)

*Primary Examiner* — Travis S Fissel
(74) *Attorney, Agent, or Firm* — Fenwick & West LLP (57) ABSTRACT

A contact lens having a cap, core, and base forming three layers to allow for the contact lens to be thick enough to accommodate a payload, while ensuring sufficient oxygenation of the wearer's eye. The cap and base are each a thin layer of gas-permeable material, each shaped to form an air gap between them and the core. The two air gaps are connected by air passages that traverse the core. Oxygen from an outside environment passes through the gas-permeable cap to reach the outer air gap, through the air passages to the inner air gap, and through the gas-permeable base to reach the cornea of the wearer's eye. The cap may be annular in form, having a center hole such that the cap does not extend over the central zone of the core, reducing a thickness of the contact lens.

20 Claims, 10 Drawing Sheets

(56) References Cited

U.S. PATENT DOCUMENTS

| | | | |
|---|---|---|---|
| 6,106,553 A | 8/2000 | Feingold | |
| 8,153,726 B2 | 4/2012 | Hoffman | |
| 8,911,078 B2 | 12/2014 | Meyers | |
| 9,039,171 B2 | 5/2015 | Groisman | |
| 9,063,352 B2 | 6/2015 | Ford | |
| 9,310,627 B2 | 4/2016 | Havenstrite | |
| 9,341,864 B2 | 5/2016 | De Juan, Jr. | |
| 9,389,434 B2 | 7/2016 | Jubin | |
| 9,395,468 B2 | 7/2016 | Havenstrite | |
| 9,442,307 B2 | 9/2016 | Meyers | |
| 9,740,026 B2 | 8/2017 | De Juan, Jr. | |
| 10,359,648 B2 | 7/2019 | Kim | |
| 10,754,178 B2 | 8/2020 | Kim | |
| 2006/0290882 A1 | 12/2006 | Meyers | |
| 2010/0001926 A1 | 1/2010 | Amirparviz | |
| 2010/0118262 A1 | 5/2010 | Rosenthal | |
| 2012/0218508 A1 | 8/2012 | Pugh | |
| 2012/0232649 A1 | 9/2012 | Cuevas | |
| 2013/0184554 A1 | 7/2013 | Elsheikh | |
| 2013/0308092 A1* | 11/2013 | Groisman | G02C 7/04 351/159.04 |
| 2014/0192315 A1 | 7/2014 | Liu | |
| 2015/0234204 A1 | 8/2015 | Havenstrite | |
| 2015/0312560 A1 | 10/2015 | Deering | |
| 2016/0054589 A1 | 2/2016 | Otts | |
| 2016/0091737 A1 | 3/2016 | Kim | |
| 2016/0216534 A1 | 7/2016 | Legerton | |
| 2016/0266406 A1 | 9/2016 | Meyers | |
| 2016/0349535 A1 | 12/2016 | Creighton | |
| 2016/0379054 A1 | 12/2016 | Sicari | |
| 2017/0242269 A1 | 8/2017 | Havenstrite | |
| 2017/0299692 A1 | 10/2017 | Krasner | |
| 2017/0299892 A1 | 10/2017 | Pugh | |
| 2017/0360994 A1 | 12/2017 | Havenstrite | |
| 2018/0088350 A1 | 3/2018 | Otts | |
| 2018/0203257 A1* | 7/2018 | Pugh | G02C 7/047 |
| 2018/0224671 A1 | 8/2018 | Lemoff | |
| 2018/0316224 A1 | 11/2018 | Maynard | |
| 2019/0250432 A1 | 8/2019 | Kim | |

OTHER PUBLICATIONS

Harvitt, D.M. et al., "Re-Evaluation of the Oxygen Diffusion Model for Predicting Minimum Contact Lens Dk/t Values Needed to Avoid Corneal Anoxia," Optometry and Vision Science, 1999, pp. 712-719, vol. 76, No. 10.

Holden, B.A. et al., "Critical Oxygen Levels to Avoid Corneal Edema for Daily and Extended Wear Contact Lenses," Investigative Ophthalmology & Visual Science, Oct. 1984, pp. 1161-1167, vol. 25, No. 10.

PCT International Search Report and Written Opinion, PCT Application No. PCT/US2018/016419, dated Apr. 4, 2018, 11 pages.

PCT International Search Report and Written Opinion, PCT Application No. PCT/US2019/060071, dated Jan. 22, 2020, 17 pages.

* cited by examiner

OXYGEN PERMEABLE CONTACT LENSES WITH THICK PAYLOADS

CROSS-REFERENCE TO RELATED APPLICATION(S)

This application is a continuation of co-pending U.S. application Ser. No. 16/184,242, filed on Nov. 8, 2018, titled "Oxygen Permeable Contact Lenses with Thick Payloads," which is hereby incorporated by reference in its entirety.

BACKGROUND

1. Technical Field

This disclosure generally relates to contact lenses and in particular to oxygen permeable contact lenses that carry payloads.

2. Description of Related Art

Contact lenses that provide refractive vision correction are ubiquitous. In addition, therapeutic lenses may be used to treat eye diseases and injuries. For example, scleral contact lenses, which are supported at the periphery of the eye, may be used to treat cornea disorders and severe dry eye syndrome, in addition to providing refractive vision correction.

Due to the lack of blood vessels within the human cornea, the tissue that makes up the cornea receives oxygen through exposure to the air. As such, in order to maintain corneal health, any contact lens disposed over the cornea requires at least a threshold amount of oxygen permeability to allow for sufficient oxygenation of the cornea.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A contact lens may carry a payload for performing various functions. For example, an electronic contact lens may contain a payload of one or more electronic components, such as an imaging device, one or more sensors, etc. The contact lens must have a sufficient thickness to accommodate the payload. However, a greater contact lens thickness may result in a reduction of the amount of oxygen that can be transmitted through the material of the contact lens to reach the cornea in comparison to thinner contact lenses.

Figure 2A:
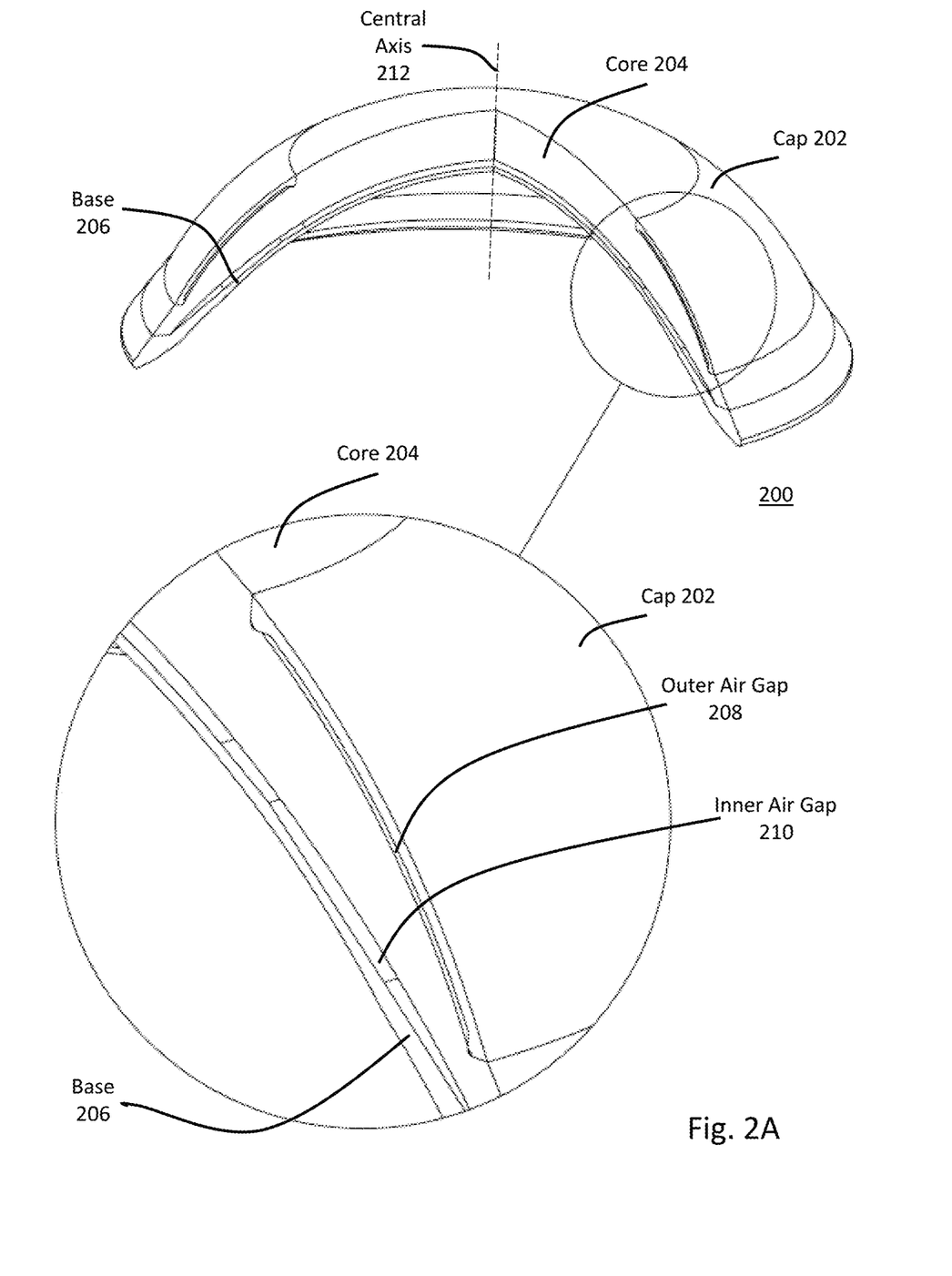
FIG. 2A is a simplified perspective view of a three layer contact lens able to accommodate a thick payload.
Figure 2B:
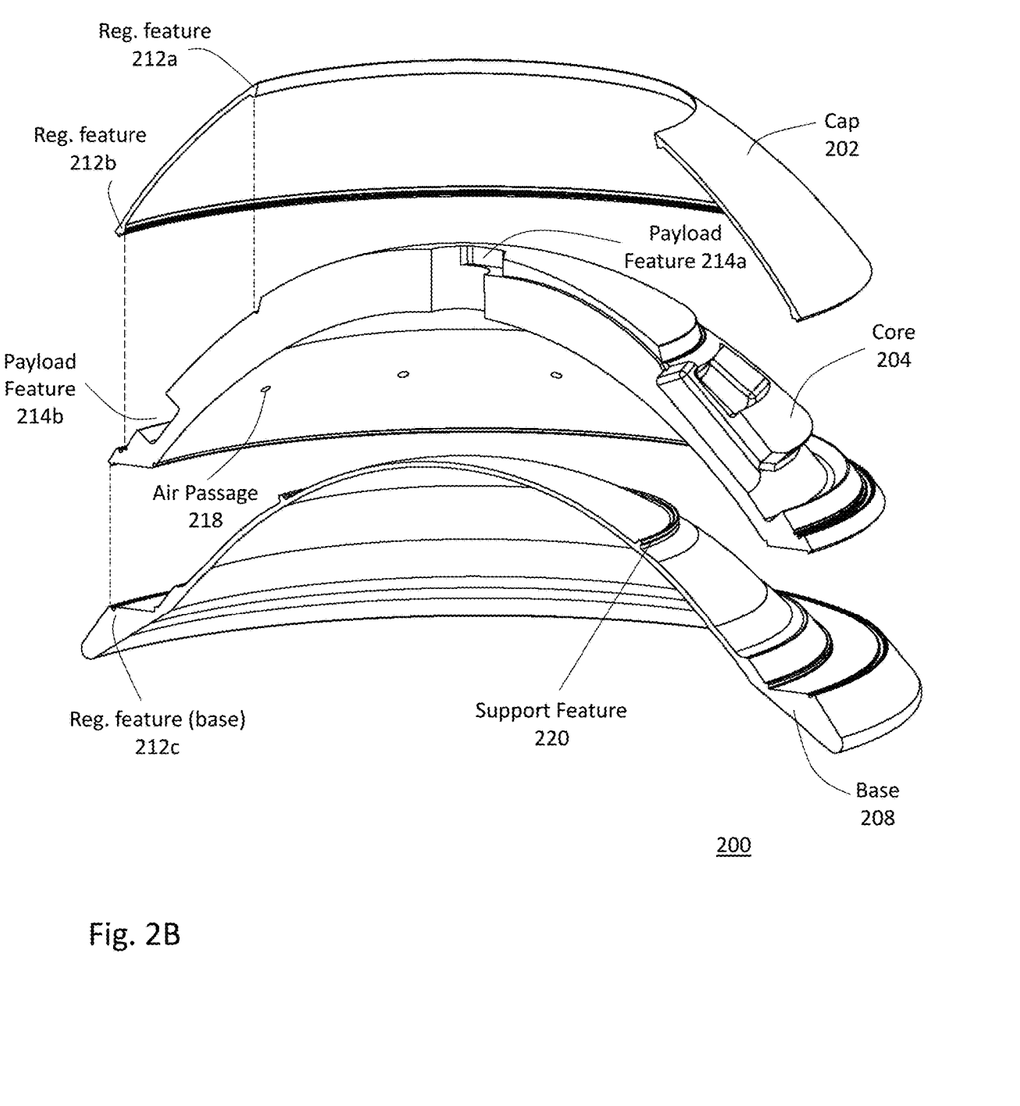
FIG. 2B illustrates a more detailed exploded view of the components of the three-layer contact lens illustrated in FIG. 2A.
Figure 2C:
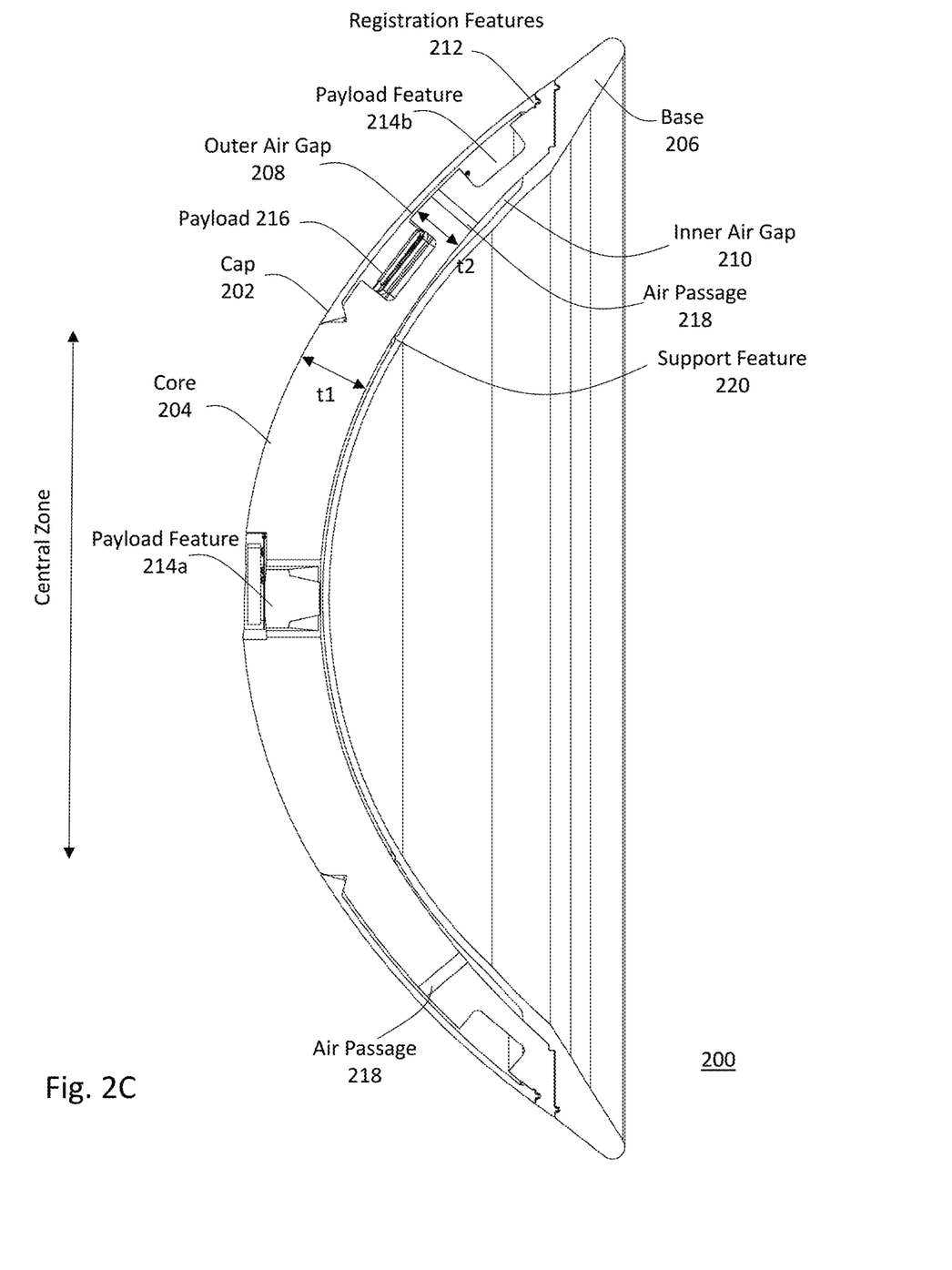
FIG. 2C shows a more detailed cross-sectional view of the three-layer contact lens illustrated in FIG. 2A.

In order to ensure sufficient corneal oxygenation, a contact lens may be constructed in three layers, for example as shown in greater detail in FIG. 2. The middle structure may contain a payload(s) and is referred to as the core. The outward-facing (i.e., facing the external environment) surface of the core is covered at least partially by an outer structure, which is referred to as the cap. An inner structure, referred to as the base, is positioned between the core and the eye. When worn by a wearer, the cap faces the outside environment, while the base is proximate to an outer surface of the wearer's eye. The cap and base are each a thin layer of gas-permeable material, each shaped to form an air gap between them and the core. The two air gaps are connected by one or more air passages that traverse the core. Oxygen from the outside environment passes through the gas-permeable cap to reach the outer air gap formed between the cap and the core, through the air passages to the inner air gap formed between the core and the base, and through the gas-permeable base to reach the cornea of the wearer's eye.

The cap is shaped so that it lies entirely outside a central zone of the contact lens. For example, the cap may have an annular shape that covers only areas in the peripheral zones of the core, instead of a dome shape that covers both the central zone and peripheral zones of the core. As a result, the total thickness of the contact lens is reduced compared to designs in which the cap extends over the central zone of the contact lens, because the extra thickness of the cap is not included as part of the thickness of the contact lens over the central zone. In addition, by shaping the cap such that it lies entirely outside the central zone, a number of boundaries between different materials that light may need to pass through en route to the wearer's eye in comparison to if the cap was formed to cover the central zone. As such, light passing through the contact lens to reach the wearer's eye does not pass through boundaries between the cap, air gap, and core, eliminating potential optical reflection or scattering that may occur at such boundaries. Furthermore, an annular cap may be easier to support than one that extends over the entire center area of the contact lens (e.g., dome-shaped cap), and may be less prone to breakage or cracking. Thus, the cap can be thinner while still maintaining structural integrity, potentially increasing the oxygen transmission through the cap.

In some embodiments, the cap, core and base parts are fabricated separately, and assembled together using an adhesive. One or more interfaces may be formed on these parts in order to ensure proper alignment and a reliable adhesive bond line for assembling the parts together. For example, the cap may be aligned with the core at an alignment stop surface. The cap includes a protrusion that displaces glue deposited in a recess formed in the core. The displacement forms a controlled thickness bond line of glue on one side of the protrusion while some glue flows just to an outer surface of the contact lens through capillary action. This allows for the parts to be assembled together without the glue overflowing if more than an ideal amount of glue is deposited.

Figure 1:
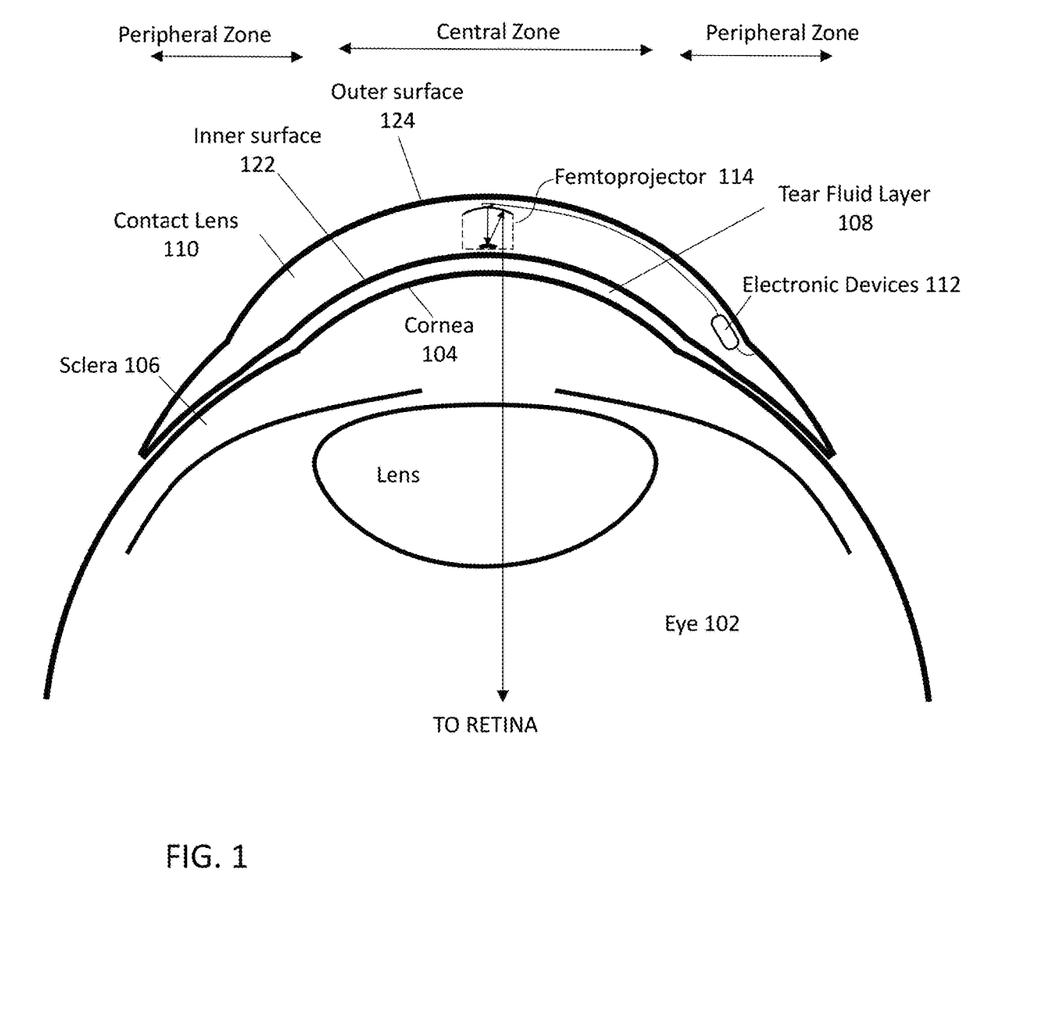
FIG. 1 shows a cross sectional view of a scleral contact lens mounted on an eye.

FIG. 1 shows a cross sectional view of an example scleral contact lens mounted on an eye. Scleral contact lenses are designed to not move on the cornea of the wearer's eye, but the contact lens does not have to be scleral. The eye 102 includes a cornea 104 and a sclera 106. The contact lens 110 is designed to contact the sclera 106 and to form a tear fluid layer 108 over the cornea 104. The tear fluid layer may have a thickness of about 10 um to about 200 um over the cornea. Oxygen permeates through the contact lens 110 and tear fluid layer 108 to the cornea 104, at a rate depending upon the geometry of the contact lens 110 and the oxygen transmissibility and thicknesses of the materials that form the contact lens 110.

The contact lens 110 contains payload(s) that may include active electronics. As used herein, "active" electronics may refer to electronic components capable of manipulating a signal based upon a control signal, and may include components containing transistors or integrated circuits. The active payloads may include active electronics 114 located within a central zone of the contact lens 110, as well as active electronics 112 located outside the central zone. As an example, the payloads may include a femtoprojector 114 that projects images onto the wearer's retina and corresponding electronics 112 to operate the femtoprojector. Other payloads may include passive devices (e.g., inactive electronics), such as a coil or antenna for wireless power or data transmission.

As used herein, the central zone of the contact lens 110 refers to a portion of the contact lens 110 that is within a certain distance of the optical axis of the eye 102. Conceptually, the size of the central zone may be based on the size of the optical aperture of the eye, as projected onto the contact lens 110, such that light rays that pass through or originate from within the central zone of the contact lens also pass through the optical aperture of the eye and contribute to image formation on the retina. On the other hand, light rays from outside the central zone of the contact lens are blocked from entering the optical aperture of the eye and reaching the retina. For example, the femtoprojector 114 is located within the central zone and so is able to project light onto the retina of the eye 102. In some embodiments, the femtoprojector 114 is located near the center of the central zone in order to project towards a center of the retina of the eye 102 (e.g., as illustrated in FIG. 1). However, in other embodiments, the femtoprojector 114 may be located near an edge of the central zone in order to project towards a peripheral portion of the retina of the eye 102. In addition, payload components of the contact lens 110 not intended to project light towards the eye 102 may be located outside the central zone of the contact lens 110, in order to prevent the components from blocking light from reaching the retina.

However, defining the central zone of the contact lens 110 in this way would result in different size central zones for different people due to variations in eye dimension, for different lighting conditions due to changing of the pupil size, and for different fields of view due to off-axis rays. As a result, the central zone may be defined as the area of the contact lens that is within a specified distance of the optical axis, where the distance is selected based on the concepts described above. In some embodiments, the central zone is an 8 mm diameter central zone. The diameter of the central zone is typically 2-8 mm.

On the other hand, the portion of the contact lens 110 that rests on the sclera 106 is outside the central zone, and the wearer's view of the outside world is not affected if that part of the lens is opaque or light-blocking. In addition, in some cases, the central zone is smaller than the cornea 104. As such, portions of the contact lens 110 that are outside the central zone (hereinafter referred to as the "peripheral zone" of the contact lens) may still laterally overlap the cornea 104.

The contact lens 110 has an outer surface 124 and an inner surface 122. As used herein with respect to the contact lens, terms such as "outer" "over" "top" "up" and "anterior" refer to the direction away from the wearer's eye, while "inner" "under" "bottom" "down" and "posterior" refer to the direction towards the wearer's eye.

As an example, a contact lens may be constructed from a rigid gas permeable material having an oxygen permeability of approximately $$Dk \cong 100 \times 10^{-11} \left(\frac{cm^2}{sec}\right)\left(\frac{ml_{O_2}}{ml}\right)\left(\frac{1}{mmHg}\right),$$

commonly quoted as Dk="100", wherein D corresponds to a diffusion constant measured in $$\left(\frac{cm^2}{sec}\right),$$

and k corresponds to a concentration of $O_2$ per unit of $O_2$ partial pressure, and is measured in $$\left(\frac{ml_{O_2}}{ml}\right)\left(\frac{1}{mmHg}\right).$$

As such, a 200 um thickness of this material has oxygen transmissibility $$Dk/t \cong 50 \times 10^{-9} \left(\frac{cm}{sec}\right)\left(\frac{ml_{O_2}}{ml}\right)\left(\frac{1}{mmHg}\right),$$

commonly quoted as Dk/t="50", wherein t corresponds to a thickness of the material. Generally, an oxygen transmissibility of Dk/t="24" is the minimum recommended for daily wear contact lenses, while an oxygen transmissibility of Dk/t="87" is the minimum recommended for extended wear lenses in contact with the cornea. See, e.g., Holden and Mertz, Investigative Ophthalmology and Visual Science 25:1161-1167, 1984. Dk can be measured in Barrers, where $$1 \text{ Barrer} = 10^{-10} \frac{cm_{STP}^3 \cdot cm}{cm^2 \cdot sec \cdot cmHg} =$$

$$10^{-11} \frac{cm_{STP}^3 \cdot cm}{cm^2 \cdot sec \cdot mmHg} = 10^{-11}\left(\frac{cm_{STP}^3}{cm^3}\right)\left(\frac{cm^2}{sec}\right)\left(\frac{1}{mmHg}\right),$$

and $cm_{STP}^3$ refers to a number of gas molecules that would occupy a space of 1 cubic centimeter (1 cc) at STP (standard temperature and pressure), as calculated using the ideal gas law.

In addition, scleral lenses such as the contact lens 110 illustrated in FIG. 1 create a tear pocket 108 between the contact lens 110 and the cornea 104, the oxygen transmissibility (Dk/t) of the tear pocket 108 is also considered when determining an overall oxygen transmissibility of the contact lens. As such, a rigid gas permeable scleral lens made of a uniform material and having a thickness greater than a few hundred microns may not satisfy oxygen transmission requirements. Due to these oxygen transmission requirements, conventional scleral contact lenses typically cannot be more than 100 to 200 um in thickness. However, many types of payloads (e.g., active payloads containing active electronics) may require a greater thickness (e.g., 500 to 1000 um or more).

FIG. 2A is a simplified perspective view of a three layer contact lens 200 able to accommodate a thick payload (e.g., greater than 500 um thick), in accordance with some embodiments. As illustrated in FIG. 2A, the contact lens 200 comprises a cap 202, a core 204, and a base 206. The cap 202 is positioned adjacent to an outer surface of the core 204, while the base 206 is positioned adjacent to an inner surface of the core 204. Together, the cap 202, core 204, and base 206 correspond to the three layers of the three layer contact lens 200. When worn by a wearer, the base 206 is positioned adjacent to the wearer's eye (cornea and sclera) and separated from the surface of the wearer's eye by a tear layer, while the cap 202 and portions of the core 204 are exposed to air (except when the wearer closes their eye or blinks).

The cap 202, core 204, and base 206 are shaped such that when the contact lens 200 is assembled, an outer air gap 208 is formed between the cap 202 and the core 204, and an inner air gap 210 is formed between the core 204 and the base 206. Because the outer and inner air gaps 208 and 210 are each entirely enclosed by their respective structures, the outer and inner air gaps are not directly exposed to the external environment, preventing any debris or other contaminants from the outside air or from the tear layer from potentially reaching the outer air gap 208 or inner air gap 210.

The cap 202 and base 206 are each relatively thin in comparison to the core 204, and are made of materials that are permeable to oxygen such as rigid gas permeable ("RGP") plastic. On the other hand, the core 204 is sufficiently thick to accommodate a desired payload, such as a femtoprojector or one or more other types of electronic components. The core 204 may also be made from an oxygen permeable material such as RGP, or from an oxygen impermeable material such as poly(methyl methacrylate) ("PMMA"). Other oxygen permeable materials may be substituted for RGP and other oxygen permeable or non-permeable materials may be substituted for PMMA. In some embodiments, the core 204 does not contain a payload. The thickness of the core 204 may be such that a conventional scleral lens having the thickness and material of the core 204 would have insufficient oxygen transmission. The cap 202, core 204, and base 206 are bonded to each other via an adhesive. Suitable adhesives may include glues such as medical grade optical cement. Example glues that may be appropriate for this application include UV-curable optical adhesives from Henkel Loctite.

The cap 202 has an annular shape, such that when the cap 202 is placed over the core 204, the cap 202 covers only areas within the peripheral zones of the core, while leaving the central zone of the core 204 exposed to the air. For example, the cap 202 may be formed with a center hole having a predetermined radius corresponding to a size of the central zone of the core 204 (e.g., 4 mm radius). As used herein, "radius" may refer to a distance along an axis orthogonal to the central axis 212 of the contact lens 200.

Because the cap 202 does not extend over the central zone of the core 204, the cap 202 does not contribute to the total thickness of the contact lens 200 within the central zone. This allows for the contact lens 200 to have a reduced thickness in comparison to if the contact lens 200 was constructed with a cap that extended over the central zone of the core 204. In addition, light passing through the contact lens to reach the wearer's eye does not pass through boundaries between the cap 202, the outer air gap 208, and the core 204, eliminating potential optical reflection or scattering that may occur at such boundaries. Furthermore, an annular cap 202 may be more durable and more easily supported by the core 204 in comparison to one that extends over the entire central zone of the contact lens. Thus, the cap 202 can be made thinner while still maintaining structural integrity, potentially increasing the oxygen transmission through the cap 202 to reach the outer air gap 208.

The cap 202 is exposed to air or separated from air by a thin tear layer (typically about 10 μm in thickness) that forms over the cap 202. As such, oxygen is able to diffuse from the surrounding air through the gas permeable material of the cap 202 (and thin tear layer) to reach the outer air gap 208. The oxygen collected in the outer air gap 208 is then able to diffuse rapidly through one or more air passages 218 (not shown in FIG. 2A) through the core 204 to traverse through the thickness of the core 204 to reach the inner air gap 210. From the inner air gap 210, oxygen is able to diffuse through the gas permeable material of the base 206 to reach the tear fluid layer and underlying cornea of the wearer. Because the inner air gap 210 may be configured to cover a large portion of the wearer's cornea, oxygen may be substantially evenly distributed across the wearer's cornea through the base 206.

Because oxygen diffusion through the air (such as the air of the inner and outer air gaps, as well as the air passages traversing the core 204) is roughly 100,000 times more rapid than diffusion through permeable solids such as RGP, the oxygen transmissibility of the contact lens 200 is defined primarily by the thicknesses of the cap 202 and base 206, and not by thickness of the outer air gap 208, inner air gap 210, or the core 204. For example, the "Dk/t" of the entire contact lens 200 may be approximated based upon the "Dk/t" of the cap 202 and base 206 overlapping the outer air gap 208 and inner air gap 210, and not on the thickness or material of the core 204. As such, the thickness and material of the core 204 may be selected to be able to accommodate a desired payload and provide sufficient structural strength to support the payload.

FIG. 2B illustrates a more detailed exploded view of the components of the three-layer contact lens 200, in accordance with some embodiments. FIG. 2C shows a more detailed cross-sectional view of the three-layer contact lens 200, in accordance with some embodiments. As illustrated in FIGS. 2B and 2C, the cap 202, core 204, and base 206 are overlaid on top of each other to form the contact lens 200, and may be aligned using one or more registration features. For example, the cap 202 may comprise a first registration feature 212a and a second registration feature 212b configured to interface with corresponding registration features of the core 204. In some embodiments, the first registration feature 212a corresponds to a radius of the center hole of the cap 202, while the second registration feature 212b corresponds to a peripheral radius of the cap 202. The base 208 may comprise a registration feature 212c configured to interface with a corresponding registration feature of the core 204.

As illustrated in FIG. 2C, the cap 202 and the core 204 are shaped to define the outer air gap 208 between the cap 202 and core 204. In addition, the cap 202 and core 204 are shaped such that an outer surface of the cap 202 aligns with an outer surface of the core 204 in the central zone when the cap 202 is placed over the core 204, in order for the collective outer surface of the contact lens 200 as defined by the cap 202 and core 204 to be substantially smooth, and not have protrusions or discontinuities. For example, the core 204 may have a first thickness t1 in the central zone, and a second thickness t2 in portions of the peripheral zone that is less than the first thickness t1. When the cap 202 is placed over the area of the peripheral zone having the second thickness t2, the outer surface of the cap 202 will aligns with the outer surface of the core 204 in the central zone having the first thickness t1. In addition, the cap 202 and the core 204 are further shaped such that a bottom surface of the cap 202 is spaced apart from an outer surface of the core 204 when the cap 202 is placed over the core 204, creating the outer air gap 208 between the core 204 and the cap 202.

In some embodiments, at least one of the cap 202 and core 204 has a non-uniform thickness between the registration features 212a/b in order to define the outer air gap 208 between the cap 202 and the core 204. Similarly, the base 206 may have a non-uniform thickness in order to define the inner air gap 210 between the base 206 and the core 204. For example, as illustrated in FIG. 2C, the inner surface of the core 204 may be substantially smooth, while the thickness of the base 206 varies between the registration feature 212c and the central axis of the contact lens so as to form a space between the base 208 and the inner surface of the core 204, defining the inner air gap 210 when the base 206 and core 204 are attached to each other.

In some embodiments, the core 204 comprises one or more features for accommodating one or more payload components. For example, as illustrated in FIG. 2B, the core 204 has a through-hole 214a within the central zone of the core for accommodating an electrical device such as a femtoprojector. The femtoprojector may be placed within the through-hole 214a and secured using an encapsulating material, which functions both to fix the position of the femtoprojector and to protect the femtoprojector from the outside environment.

In addition, the core 204 may comprise one or more payload features 214b in a peripheral region of the core, to accommodate one or more additional payload components. For example, the payload feature 214b may be in the form of a groove formed around a circumference of the core 204, having a depth sufficient for winding the power coil around the core 204, such that the power coil does not protrude from the payload feature 214b. The core 204 may further comprise additional payload features for accommodating additional payload components 216 (e.g., as illustrated in FIG. 2C), wiring or electrical connections between payload components, etc.

In some embodiments, the payload feature 214b within the peripheral region of the core 204 is located under the outer air gap 208 when the cap 202 is placed over the core 204. In some embodiments, the payload components (e.g., power coil) within the payload features may be encapsulated in an adhesive or other material such that the components are not exposed to the air within the outer air gap 208. In other embodiments, the payload components are exposed to the air within the outer air gap 208. For example, as illustrated in FIG. 2C, the payload feature 214b may be located under the cap 202, such that the payload 216 (e.g., a power coil) is located within the outer air gap 208. This enables payload components within the core to be located in the periphery areas of the core. In some embodiments, the core 204 may contain at least one payload component closer to the center of the core 204 in comparison to the one or more air passages 218 traversing the core, and at least one payload component further from the center than the one or more air passages 218.

While FIG. 2B illustrates certain payload features in the periphery regions of the core 204 being formed on the outer surface of the core 204 (e.g., payload feature 214b), in some embodiments, one or more of the payload features may be formed on the inner surface of the periphery region of the core 204.

The air passages 218 are formed within the core 204, and traverse the thickness of the core 204 to connect the outer air gap 208 to the inner air gap 210. Because the outer air gap 208 does not extend over the central zone of the core 204, the air passages 218 are formed in the peripheral zones of the core 204. In some embodiments, as illustrated in FIG. 2C, the air passages 218 are oriented to be substantially perpendicular to the outer and inner surfaces of the core 204, and connect laterally overlapping portions of the outer air gap 208 and inner air gap 210. As used herein, two entities may be referred to as "laterally overlapping" if they intersect a common line perpendicular to the outer surface of the contact lens 110.

In some embodiments, each of the air passages is substantially cylindrical in shape (e.g., having a circular cross-section). However, in other embodiments, the air passages 218 may have different shapes (e.g., different shaped cross-sections). The cross-sectional area of the air gaps 212 is configured to allow for an amount of air flow between the outer and inner air gaps that is sufficient for oxygenating the cornea of the wearer's eye.

In some embodiments, the base 206 comprises one or more support features 220 to provide structural support to the inner air gap 210. Because the inner air gap 210 may extend over both the central zone and periphery areas of the core 204 in order to allow for more even distribution of oxygen through the base 206 to reach the wearer's cornea, support features 220 within the inner air gap 210 may be useful for maintaining gap distance and overall structural integrity of the contact lens. The support features 220 may comprise one or more ridges or protrusions. For example, as illustrated in FIGS. 2B and 2C, the support feature 220 comprises a ridge protruding from the outer surface of the base 208 located at a particular radius from a central axis of the base 208. In some embodiments, the radius of the support feature 220 may be similar to the radius of the center hole of the annular cap 202. However, in order to avoid blocking oxygen flow within the inner air gap 210, the support feature 220 may extend only partway through the height of the inner air gap 210 (e.g., such that air can flow over the support feature 220), be discontinuous (e.g., not extending all the way around in a circle), or some combination thereof. Even if the support feature 220 does not extend all the way across the inner air gap 210 to contact an opposing surface (e.g., the inner surface of the core 204), the support feature 220 may still function to limit an amount of deformation of the base 206 and the inner air gap 210.

In some embodiments, instead of or in addition to support feature 220, the inner air gap 210 may contain one or more spacers (not shown), such as plastic micro balls, cylindrical or rectangular posts, etc., placed between the core 204 and the base 206 to help maintain the structural integrity of the contact lens and maintain gap distance of the inner air gap 210. In addition, in some embodiments, the support feature 220 may be formed as part of the inner surface of the core 204 instead of or in addition to on the outer surface of the base 208. In some embodiments, the core 204 and/or the cap 202 may have one or more support features for providing structural support for the outer air gap 208. In some embodiments, the one or more support structures may extend along a radius of the cap 202, core 204, or cap 206. In some embodiments, at least one of the an inner surface of the cap 202 and the outer surface of the base 206 comprises a matrix of grooves, in which the outer or inner air gap is defined by the space between the grooves and the core 204, the remaining portions of the surface of the cap or core serving as support features.

In some embodiments, the components of the contact lens (the cap 202, core 204, and base 206) are manufactured separately and assembled together at a later time. For example, the cap 202, core 204, and base 206 may each correspond to a prefabricated component.

By allowing for the components of the contact lens to be manufactured separately, different variations of one or more components can be fabricated independently, and assembled with other components to create different possible combinations. In some embodiments, the base 206 may be customized to provide a desired amount of refractive correction (e.g., customized for a specific wearer, or one or a plurality of predetermined refractive correction amounts, etc.). For example, the thickness and inner surface of the base 206 may be adjusted to achieve different amounts of refractive correction. On the other hand, the cap 202 and the core 204 may be manufactured as standard components. The outer surface of the base 206 may have a predetermined common shape, allowing for the cap 202 and core 204 to be placed on different bases 206 having different amounts of refractive correction. In other embodiments, different variations of the cap 202 and core 204 may be manufactured and assembled with the remaining components. In some embodiments, the shapes of the components may be modified by precision machining on a diamond lathe.

Figure 3A:
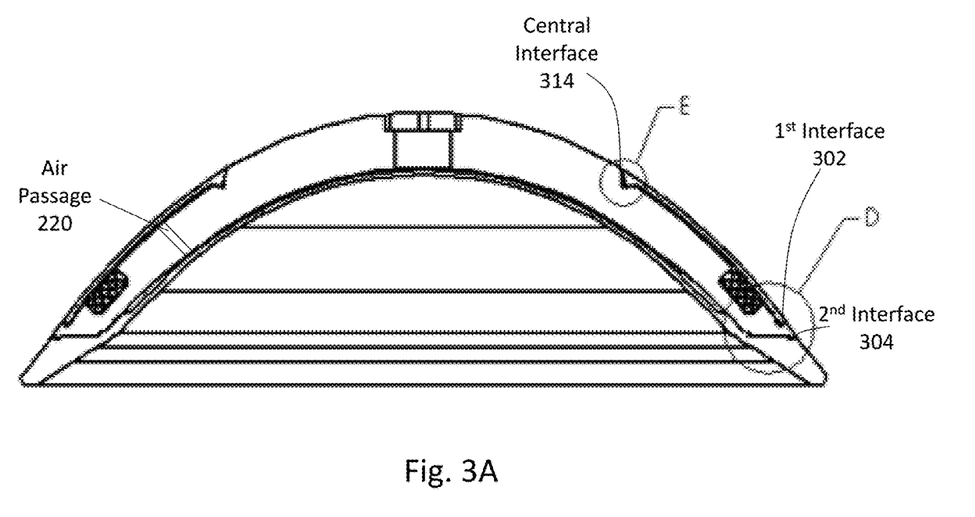
FIG. 3A shows a cross-sectional view of a three-layer contact lens.

FIG. 3A shows a cross-sectional view of a three-layer contact lens, in accordance with some embodiments. As discussed above, the components corresponding to the layers of the contact lens (i.e., cap, core, and base) may be manufactured separately and connected to each other using an adhesive material such as glue. The cap, core, and base may contact each other at one or more glue interfaces. For example, as illustrated in FIG. 3A, a peripheral edge of the cap 202 connects to the core 204 at a first interface 302, while a central edge of the cap 202 connects to the core 204 at the central interface 314. On the other hand, a peripheral edge of the core 204 connects to the base 206 at a second interface 304.

Figure 3B:
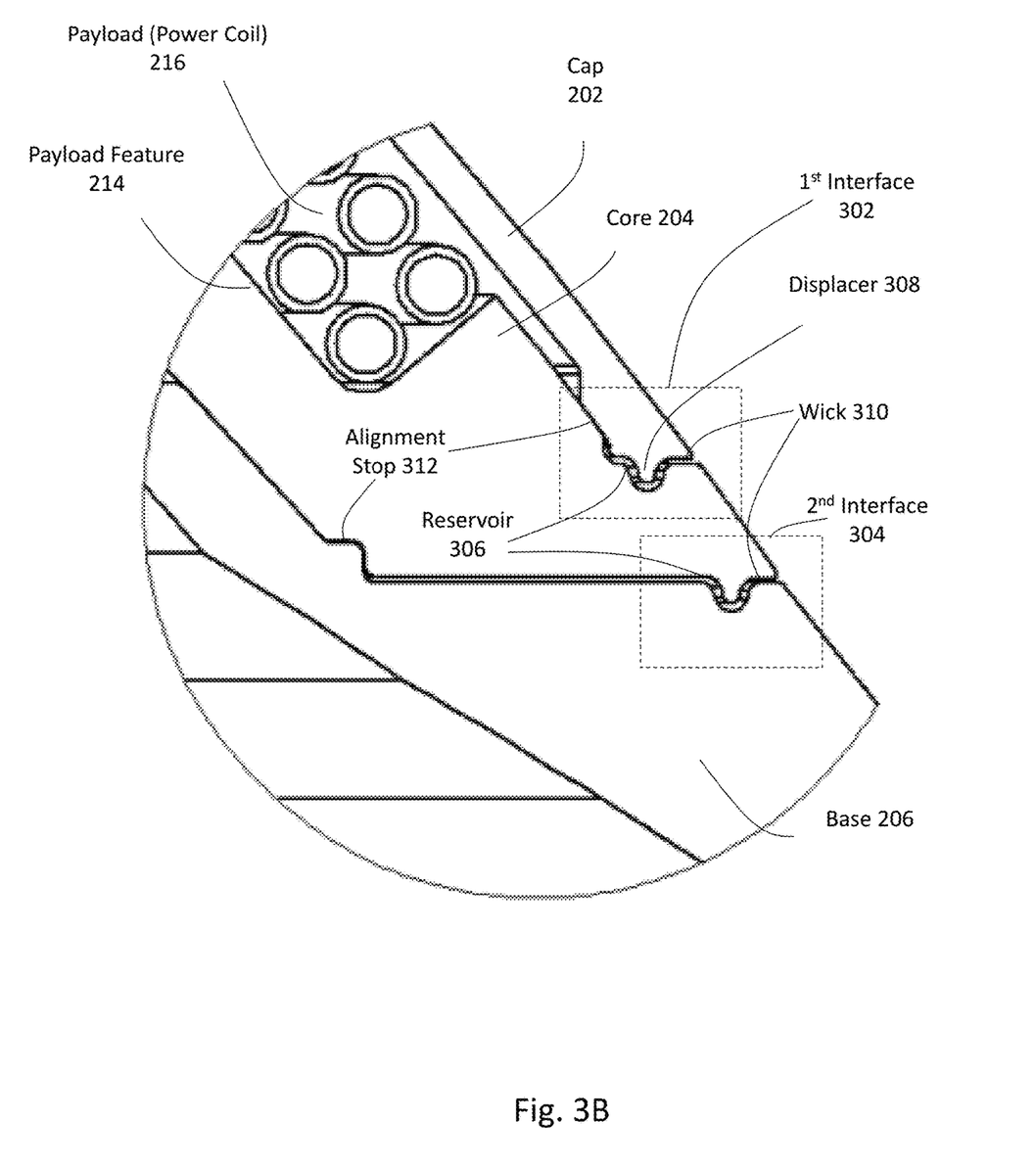
FIG. 3B illustrates a more detailed view of region D of FIG. 3A, which includes the first interface between the cap and core, and second interface between the core and base.
Figure 3C:
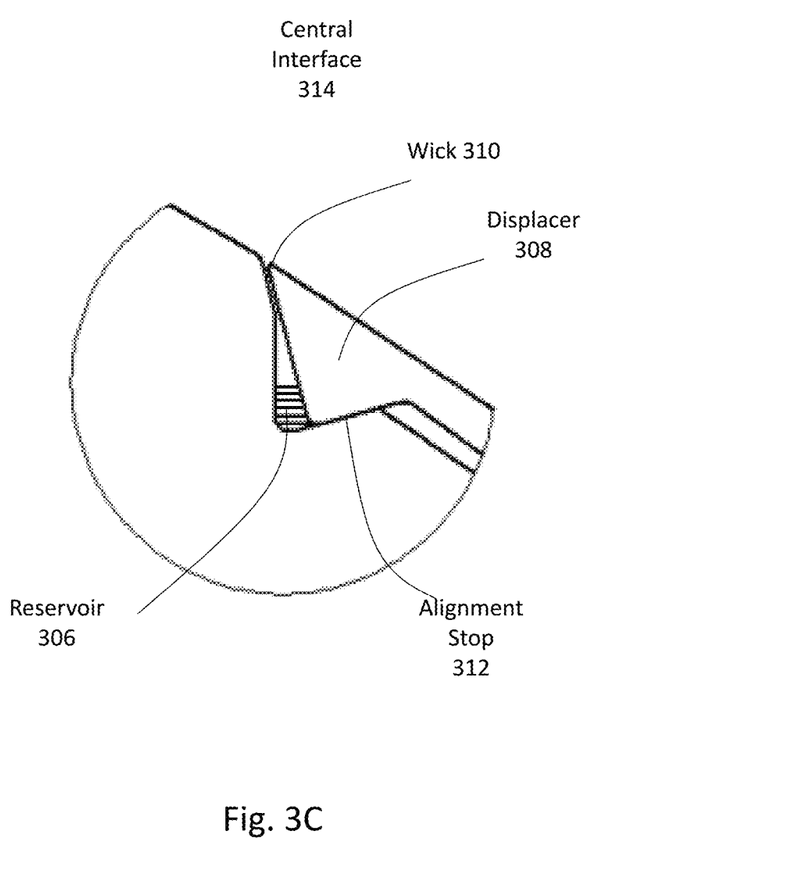
FIG. 3C illustrates a more detailed view of region E of FIG. 3A, which includes the central interface connecting the cap to the core of the contact lens.

FIG. 3B illustrates a more detailed view of region D of FIG. 3A, which includes the first interface 302 between the cap and core, and second interface 304 between the core and base. FIG. 3C illustrates a more detailed view of region E of FIG. 3A, which includes the central interface 314 connecting the cap to the core of the contact lens. Each of the glue interface 302, 304, and 314 comprises features to align the respective components being connected, as well as one or more features for controlling the flow of glue between the components, such that glue is prevented from overflowing from the interface onto the outer surfaces of the contact lens, even if more than an ideal amount of glue is deposited between the components at the glue interface.

The first glue interface 302, as illustrated in FIG. 3B, comprises a reservoir 306, a displacer 308, and a wick 310. The displacer 308 is formed as a convex feature (e.g., a protrusion or ridge) on the cap 202, while a corresponding concave feature (e.g., a depression or groove) is formed on the core 204. In addition, a portion of the inner surface of the cap 202 and a portion of the outer surface of the core 204 (hereinafter, "alignment surfaces") may function as an alignment stop 312 that aligns the cap 202 to the core 204 when the cap 202 is placed over the core 204.

Prior to assembly, an amount of glue is placed into the concave feature formed on the core 204 (hereinafter referred to as the "recess"). When the cap 202 is placed on the core 204, the alignment surfaces of the cap 202 and the core 204 contact each other to form the alignment stop 312 and radially align the cap 202 and core 204 relative to each other. In addition, the alignment surfaces may be shaped such that the stop 312 also aligns cap 202 to the core 204 in an axial direction.

When the cap 202 and the core 204 are aligned, the displacer 308 on the cap 202 aligns with the corresponding recess on the core 204, and displaces glue from the recess. At least a portion of the displaced glue is drawn up the wick 310, which is formed as the narrowing gap between the surfaces of the cap 202 and core 204 as the cap 202 is aligned with the core 204. The displaced glue is drawn up the wick 310 towards a seam at the outer surfaces of the cap 202 and the core 204 through surface tension and capillary action.

The recess is larger than the displacer 308, such that when the displacer 308 is positioned within the recess, a reservoir 306 is formed on a side of the displacer 308 opposite from the wick 310 to accommodate any excess glue that would otherwise flow past the seam between the cap 202 and core 204. For example, the reservoir 306 of first glue interface 302 illustrated in FIG. 3 may include excess space on a side of the displacer 308 opposite from the wick 310, allowing for any excess glue to flow in a direction opposite from and away from the wick 310. Thus, the displacer 308 may divide the glue into a first amount that flows through the wick 310, and a second excess amount that remains in the reservoir 306 on the opposite side of the displacer 308 as the wick 310, ensuring that the excess glue is not pushed past the seam between the cap 202 and core 204.

The second glue interface 304 may be constructed similarly to the first glue interface 302 as described above. For example, the second glue interface 304 may be formed by a displacer of the core 204 being aligned with (e.g., through corresponding alignment surfaces of the core 204 and base 206) a corresponding recess on the base 206. When the displacer of the core is placed within the reservoir of the base, at least a portion of the glue within the reservoir flows into the wick formed by the gap between the core and base, while a remaining excess portion of the glue is pushed into a reservoir formed on an opposite side of the displacer as the wick.

As illustrated in FIG. 3A, due to the annular shape of the cap 202, the cap 202 may be attached to the core 204 via at least two different glue interfaces (e.g., the central interface 314 and a peripheral interface (corresponding to the first interface 302 described above). In some embodiments, the displacer 308 of the central interface 314, as illustrated in FIG. 3C, is substantially wedge-shaped, having a first surface that serves as an alignment surface for the cap 202 for aligning with a corresponding alignment surface of the core 204 to form the alignment stop 312, and a second surface that aligns with a second surface of the core 204 to form the wick 310. As illustrated in FIG. 3C, the reservoir 306 may be formed on the same side of the displacer 308 as the wick 310. When the cap 202 is placed over the core 204, the displacer 308 aligns with a recess formed on the core 204, and pushes glue that has been deposited within the recess towards the wick 310 and a seam formed between the cap 202 and the core 204. In addition, any excess amount of glue that may have been deposited within the recess remains within the reservoir 306 formed between the displacer 308 and the recess, preventing glue from overflowing from the seam.

While FIGS. 3B and 3C illustrate the displacer and reservoir for each glue interface located on particular components, in other embodiments, the displacer and reservoir may be formed on different components. For example, in some embodiments, the reservoir of the first glue interface 302 may be formed on the cap 202, and the displacer on the core 204. Which component the reservoir and displacer are formed on may be based upon an expected orientation of the contact lens during assembly.

Figure 4A:
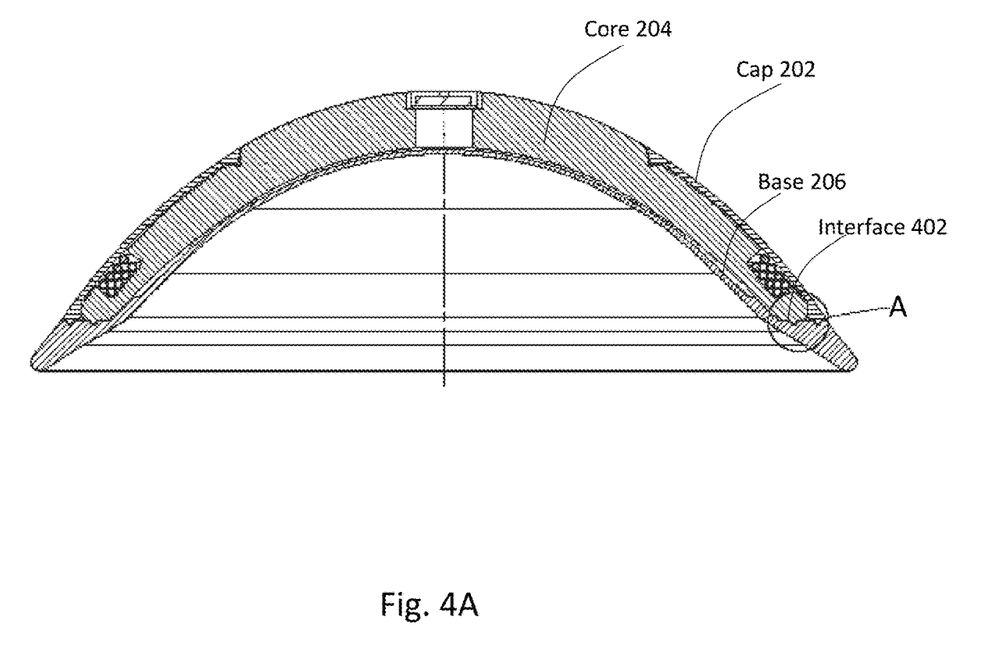
FIG. 4A shows a cross-sectional view of a three-layer contact lens having another structural interface between the cap, core, and base of a contact lens.

FIG. 4A shows a cross-sectional view of a three-layer contact lens having another structural interface between the cap, core, and base of a contact lens, in accordance with some embodiments. As illustrated in FIG. 4A, the cap, core, and base are positioned such that both the cap 202 and the core 204 are placed on a single surface of the base 206. This allows for the cap 202, core 204, and base 206 to be assembled with one less seam on the outer surface of the contact lens, in comparison to the configuration illustrated in FIGS. 3A and 3B.

Figure 4B:
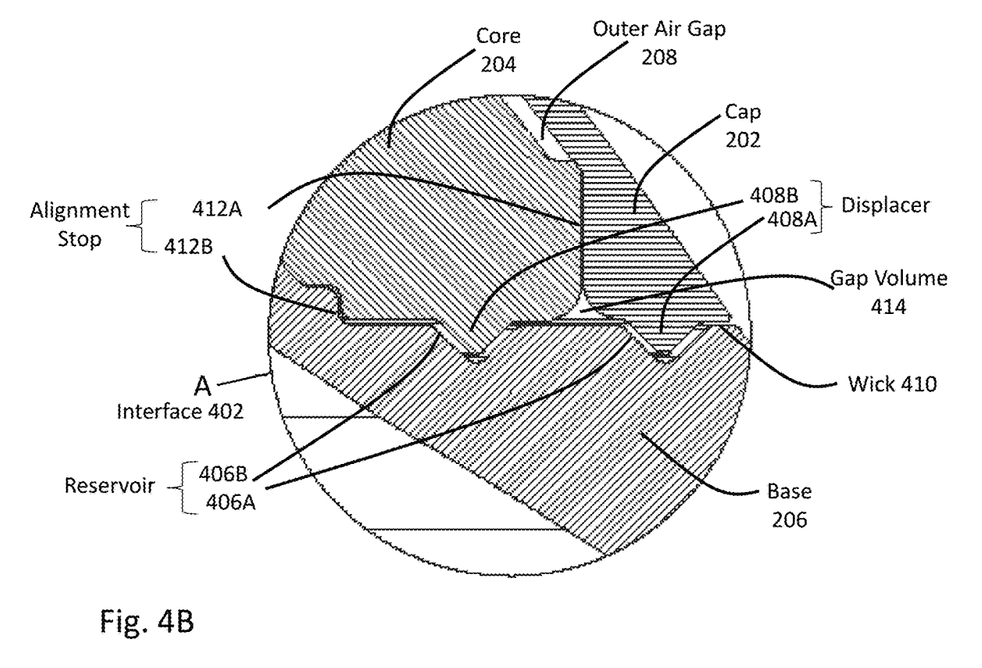
FIG. 4B shows a more detailed view of region A of FIG. 4A, containing the glue interface.

FIG. 4B shows a more detailed view of region A of FIG. 4A, containing the glue interface 402. At the glue interface 402, the base 206 may have an alignment surface configured to form an alignment stop 412B with the core 204, in order to align the core 204 with the base 206. The base 206 may also have formed thereon a pair of recesses into which glue can be deposited.

Each of the cap 202 and the core 204 may have formed thereon a respective displacer 408A and 40B configured to fit into a respective recess of the base 206. In addition, the cap 202 and core 204 each have alignment surfaces forming an alignment stop 412A between them for aligning the cap 202 with the core 204. As such, when the core 204 is placed over and aligned with the base 206 using the alignment stop 412B, and the cap 202 is placed over and aligned with the core 204 using the alignment stop 412A, the cap 202 will be aligned with the base 206, such that the displacer 408A of the cap 202 is positioned within its corresponding recess on the base 206.

When the cap 202 and core 204 are placed over the base 206, a wick 410 is formed on one side of the displacer 408A of the cap 202 by the surfaces of the cap 202 and the base 206. A portion of the glue in the recess flows into the wick 410 through surface tension and capillary action. However, a remaining excess amount of glue is pushed by the displacer 408A into the reservoir 406A on the opposite side of the displacer 408A as the wick 410, allowing for the wick 410 to receive only an amount of glue needed to fill the seam between the cap 202 and the base 206 without having glue flow over the seam, even if more than an ideal amount of glue was deposited in the recess on the base 206.

The displacer 408B of the core 204 displaces the glue deposited within the corresponding recess on the base 206. For example, a first amount of glue flows into the wick 410 formed between the core 204 and the base 206. In addition, a second amount of excess glue is pushed by the displacer 408B into the reservoir 406B.

In some embodiments, the core 202, cap 204, and base 206 are shaped such that a gap volume 414 is formed between the core 202, cap 204, and base 206. The gap volume 414 is part of the reservoir 406A and is able to receive excess glue displaced by the displacer 408A. In addition, because the interface between the core 204 and the base 206 does not include a seam on the outer surface of the contact lens, the displacer 408B may push excess glue into the reservoir 406B or into the the gap volume 414.

In some embodiments, attaching the cap 202 and core 204 onto a single surface of the base 206 (as illustrated in FIGS. 4A and 4B) may allow for a greater tolerance of excess glue, due to the gap volume 414 that can be formed between the cap 202 and the core 204. In addition, the resulting contact lens will only have one seam on the outer surface of the lens (e.g., a seam between the cap 202 and the base 208, potentially reducing a chance for outside contaminants (e.g., dust, tear fluid, etc.) to enter the contact lens through a seam.

As such, the components of the contact lens may be connected via one or more glue interfaces, where each glue interface comprising a protrusion that displaces glue deposited in a recess such that a first amount of glue flows to a seam formed between the components, and a second excess amount of glue is displaced into an excess reservoir volume, preventing overflow of glue beyond the outer surface of the contact lens, even if more than an ideal amount of glue is deposited.

In some embodiments, instead of being attached using glue, the components of the contact lens may be place together using a friction fit or a snap-on fit. For example, in some embodiments, the displacer of a first component may have one or more features configured to snap onto one or more features within a recess on a second component, allowing for the components to be assembled together without glue. In other embodiments, the components of the contact lens may be attached together using a laser weld or an ultrasonic bond.

Figure 5:
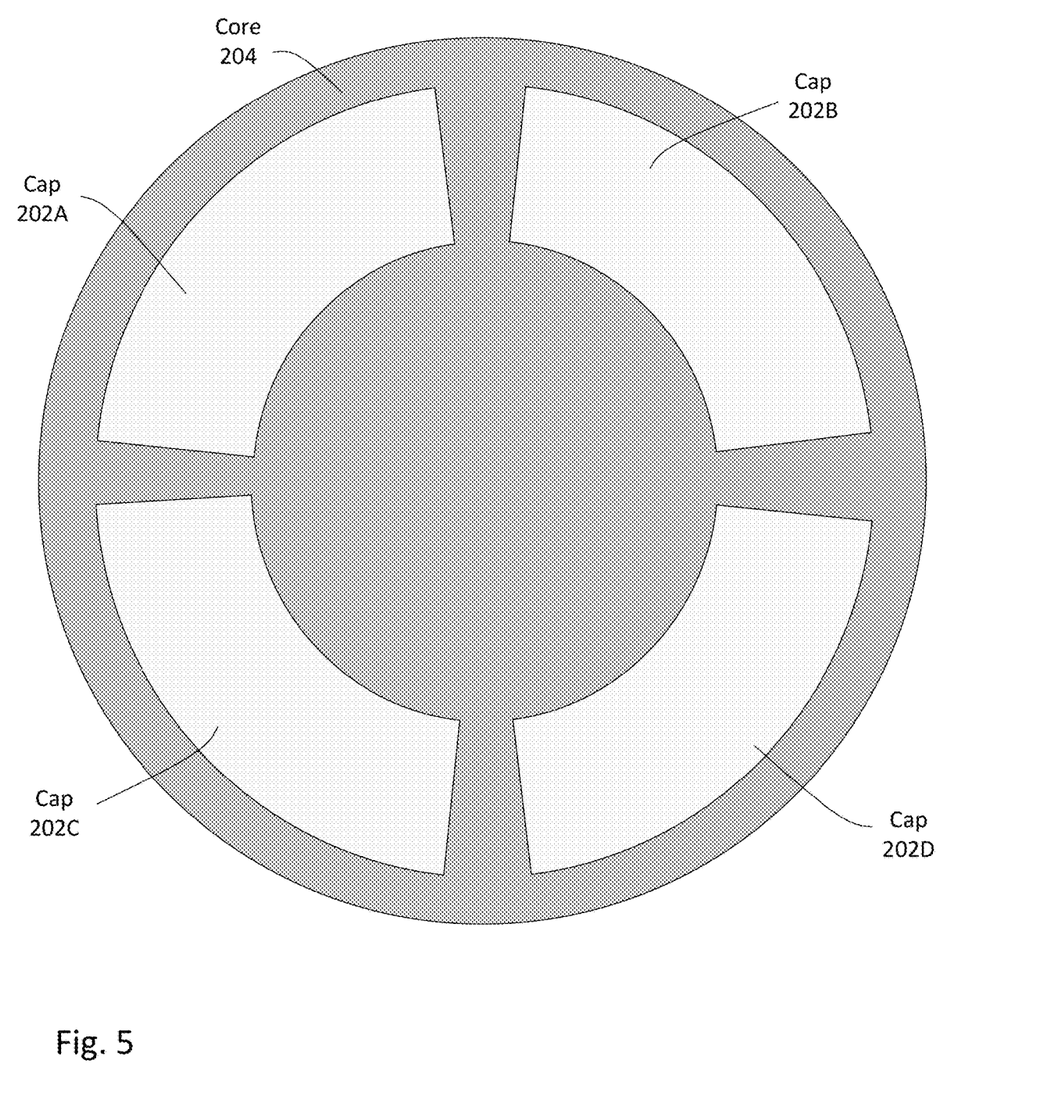
FIG. 5 illustrates a top down view of a contact lens, where the cap is divided into a plurality of separate cap pieces.

Although the above figures illustrate a contact lens having a single cap 202, in some embodiments, the cap 202 comprises several separate pieces. FIG. 5 illustrates a top down view of a contact lens, where the cap is divided into a plurality of separate cap pieces, in accordance with some embodiments. For example, as illustrated in FIG. 5, the cap 202 is divided into four separate cap pieces 202A, 202B, 202C, and 202D. When placed over the core 204, each of the cap pieces 202A-202D forms a separate outer air gap 208 between it and the core 204, each of which is connected to the inner gap 210 via one or more air passages 218. While FIG. 5 illustrates a space between each of the cap pieces 202A-D, in some embodiments, the cap pieces 202A-D directly abut each other when placed over the core 204. In some embodiments, by forming the cap 202 out of several separate pieces, an amount of stress on the cap pieces 202A-D when the cap pieces 202A-D are placed over the core 204 is potentially reduced.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the invention should be determined by the appended claims and their legal equivalents.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A contact lens to be worn on an eye, comprising:
   a core having an outer surface and an inner surface, and containing a payload;
   a gas-permeable cap located entirely outside a central zone of the contact lens and adjacent to the core's outer surface, the cap and the core's outer surface forming an outer air gap therebetween that receives oxygen from a surrounding environment through the gas-permeable cap;
   a gas-permeable base adjacent to the core's inner surface and disposed over the cornea of the eye, the base and the core's inner surface forming an inner air gap therebetween that passes oxygen to the cornea of the eye through the gas-permeable base; and
   wherein the core contains a network of one or more air passages traversing the core from the outer air gap to the inner air gap.

2. The contact lens of claim 1, wherein the cap is an annular cap with a center hole of at least 5 mm diameter.

3. The contact lens of claim 2, wherein a center portion of the core's outer surface is flush with an outer surface of the annular cap.

4. The contact lens of claim 1, wherein the core has a thickness such that oxygen flow through the material of the core is not sufficient to oxygenate the cornea of the eye.

5. The contact lens of claim 1, wherein the core comprises a gas-impermeable material.

6. The contact lens of claim 1, wherein the payload comprises a passive device.

7. The contact lens of claim 1, wherein at least a portion of the payload is located closer to the center of the core than the air passages traversing the core.

8. The contact lens of claim 1, wherein the inner and outer air gaps laterally overlap and the one or more air passages are oriented substantially perpendicular to both the inner and the outer air gaps.

9. The contact lens of claim 1, wherein the core contains a power coil housed within a groove formed on the outer surface of the core.

10. The contact lens of claim 9, wherein the groove is formed within the portion of the outer surface of the core covered by the cap, such that the cap prevents exposure of the power coil to the outer environment.

11. The contact lens of claim 9, wherein the power coil is located within the outer air gap.

12. The contact lens of claim 1, wherein at least one of the cap and the base comprises one or more protrusions providing structural support to maintain the respective outer or inner air gap.

13. The contact lens of claim 1, wherein at least one of the outer air gap and the inner air gap is formed by a matrix of grooves on a surface of the respective cap or base.

14. The contact lens of claim 1, wherein the cap, base, and core are glued together.

15. The contact lens of claim 14, wherein a first part of the cap, core and base has a recess; a second part of the cap, core and base has a corresponding protrusion; the first and second parts are positioned to form a seam between the first and second parts on a first side of the protrusion; such that the first and second parts are glued together by a glue seam formed by a flow of glue by capillary action from the recess into the seam.

16. The contact lens of claim 15, wherein the first and second parts are further positioned to form a reservoir for receiving excess glue on a side of the protrusion opposite from the seam.

17. The contact lens of claim 14, wherein a first part of the cap, core and base has a recess; a second part of the cap, core and base has a corresponding protrusion; and the first part and second part are glued together by:
   depositing glue into the recess; and
   aligning the two parts, thereby causing the protrusion to displace some of the glue deposited within the recess, wherein displacement of the glue flows by capillary action from the recess to a seam on a first side of the protrusion, and where an excess amount of glue remains in a reservoir formed between the two parts on an opposite side of the protrusion.

18. The contact lens of claim 14, wherein the cap is glued to the core, and the core is glued to the base.

19. The contact lens of claim 14, wherein the cap is glued to the base, and the core is glued to at least one of the cap and the base.

20. The contact lens of claim 1, wherein the base provides corrective optical power.

* * * * *